Patented Aug. 10, 1954

2,686,196

UNITED STATES PATENT OFFICE 2,686,196

HYDROCARBON SYNTHESIS AND CATALYST THEREFOR

Isidor Kirshenbaum, Rahway, and Kenneth K. Kearby, Cranford, N. J., assignors to Standard Oil Development Company, a corporation of Delaware No Drawing. Application March 23, 1950, Serial No. 151,534

4 Claims. (Cl. 260—449.6)

The present invention relates to catalytic conversions and improved catalysts therefor. More particularly, the invention is concerned with improved iron catalysts for the catalytic synthesis of normally liquid hydrocarbons and oxygenated compounds from CO and $H_2$.

Iron type catalysts are normally employed in the synthesis of hydrocarbons at relatively high temperatures of about 450°–800° F. and relatively high pressures of about 3–100 atmospheres abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led, in recent years, to various attempts and proposals to employ the so-called fluid catalyst technique wherein the synthesis gas is contacted with a dense turbulent bed of finely divided catalyst fluidized by the gaseous reactants and products. This technique permits catalyst replacement without interruption of the process and greatly improved temperature control. However, the adaptation of the hydrocarbon synthesis to the fluid catalyst technique has encountered serious difficulties, particularly when iron catalysts are used.

Application of the fluid technique requires ease of fluidization and attrition resistance in addition to the conventional characteristics determining catalyst activity, such as total desired yield and active catalyst life. It is also desirable that the catalyst be active in the temperature range above 600° F. and still be highly selective to $C_4^+$ hydrocarbons, since under these conditions high octane motor fuels are obtained. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals and others in small amounts of about 1–10%. While some of these catalysts exhibit excellent activity characteristics they are without exception deficient with respect to ease of fluidization, and/or attrition resistance particularly when used in commercial runs of several hundred hours' duration. Even fluidized catalysts obtained from sintered iron, which have been found to exhibit excellent fluidization and attrition characteristics show signs of disintegration in long run operation.

This general lack of mechanical resistance or steady decrease of mechanical strength during operation has been found to be closely connected to a high rate of carbon deposition on the catalyst, encountered at the conditions required by the synthesis using iron catalysts. The catalysts disintegration which accompanies excessive carbon deposition is believed to be the result of a migration of carbon into the iron lattice by the mechanism of interstitial carbide formation followed by disintegration of the carbide to free carbon. This process may continue until the catalyst mass contains about 99% of carbon.

It will be appreciated from the above that an iron catalyst of satisfactory synthesizing activity, selectivity, and catalyst life which may be used in commercial operation without substantial catalyst disintegration and carbon deposition is a need strongly felt in the synthesis art. This drawback of iron catalysts has been the major obstacle in all attempts to apply the fluid catalyst technique to the iron-catalyzed hydrocarbon synthesis. The present invention overcomes this obstacle.

It is, therefore, the principal object of the present invention to provide improved iron catalysts for the catalytic synthesis of hydrocarbons from CO and $H_2$.

A further object of our invention is to provide an improved hydrocarbon synthesis process operating in the presence of iron catalysts which are not subjected to excessive disintegration and carbon deposition.

A more specific object of our invention is to provide an improved hydrocarbon synthesis process employing the fluid catalyst technique in the presence of iron catalysts of highest disintegration resistance throughout runs of commercial length.

Other and further objects and advantages of our invention will appear hereinafter.

In accordance with the present invention, carbon deposition on iron synthesis catalysts is substantially reduced and catalyst disintegration correspondingly suppressed while activity, selectivity and catalyst life are maintained at highest levels, when the iron preferably in the form of its carbonate is combined with a metal carbonate base which in itself exhibits a high disintegration resistance and the composite is subjected to a reduction treatment. While a wide variety of metal carbonates may form, in combination with iron, catalysts of good activity, selectivity and disintegration resistance, superior results have been consistently obtained by combining iron carbonate, particularly ferrous carbonate, with the carbonates of metals of group II of the periodic system, and more particularly of one or more of the metals of calcium, barium and zinc. The relative proportions of the elements in the unreduced catalysts of the present invention may vary within wide limits. However, this iron content should not be substantially lower than about 0.5% by weight or about 1% by weight of ferrous carbonate, with the other metal carbonate being present in major proportions. Active carbonate-supported catalysts with over-all iron concentrations of less than 0.5% by weight may also be made provided that the iron is properly distributed on the surface of the catalysts. A distribution of about 5–40% by weight of ferrous carbonate and about 60–90% by weight of the carbonate of a group II metal is generally preferred.

An outstanding and surprising characteristic of the carbonate catalysts of the present invention, particularly those comprising barium and/or calcium carbonate, resides in the fact that they afford excellent conversion and liquid product yields even in the absence of the conventional catalyst promoters such as halides, carbonates or oxides of alkali metals which prior to the present invention have been considered indispensable for catalysts of satisfactory activity and selectivity.

While we do not wish to limit our invention to any specific theory or probable reaction mechanism, it is believed that the carbonate bases give the catalysts the proper alkalinity required for high selectivity to liquid product.

Examples of catalysts useful for the purposes of the present invention include composites consisting of 80% $BaCO_3$ and 20% $FeCO_3$; 80% $CaCO_3$ and 20 $FeCO_3$; 80% $ZnCO_3$ and 20% $FeCO_3$; etc.

These catalysts may be prepared by any suitable method of coprecipitation, precipitation of the iron component on the precipitated support, impregnation or mechanical mixing, known per se in the art of catalyst manufacture, followed by reduction. A simple and expedient method of adding the iron, especially in very low concentrations, to the surface of the catalyst is by the decomposition of iron carbonyl upon the catalyst. Although a number of different iron compounds such as the oxides, oxalates, acetates, etc. may be used, superior results have been obtained when using the method of precipitating ferrous carbonate on the precipitated metal carbonate support.

The invention will be further illustrated by the following specific examples.

*Example I*

About 1141 gms. of $BaCO_3$, made by the addition of ammonium carbonate to a solution of $BaCl_2$ in distilled water, was slurried in 3 liters of water. A solution of 344 gms. of $FeCl_2.4H_2O$ in 2 liters of distilled water was slowly added to this slurry. Contact with air was kept at a minimum during these steps. The slurry was stirred for one hour and an additional 149 gms. of $FeCl_2.4H_2O$ dissolved in 600 cc. of water was added. Then 285 gms. of ammonium carbonate, dissolved in 1 liter of water, were stirred in and the mixture was further stirred for one hour. The precipitate was permitted to settle, washed free of chloride by decantation, and the resulting sludge was dried over-night in an atmosphere of $CO_2$ at about 300° F. and then pilled. The catalyst contained about 80% by weight of $BaCO_3$ and 20% by weight of $FeCO_3$. It was reduced prior to use with about 1000 volumes of $H_2$ per volume of catalyst per hour for 4 hours at about 900° F.

The catalyst so prepared was tested in a fixed bed laboratory unit at about 630°–650° F., about 250 lbs. per sq. in. pressure, a throughput of about 200 volumes of synthesis gas per volume of catalyst per hour, and an $H_2$:CO ratio of about 1:1. The results are summarized below.

| | |
|---|---|
| CO Conversion, percent | 96 |
| $C_4$+ yield, cc./cu. m. $H_2$+CO consumed | 211 |
| Carbon formation: | |
|   Selectivity to C, volume per cent CO to C | 0.97 |
|   Selectivity to C, percent of reference [1] | 32 |
| Catalyst age: | |
|   Cu. ft. of CO converted per lb. of Catalyst | 69 |
|   Percent $CO_3^{--}$ After Use | 22 } Agreement within experimental error. |
|   Percent $CO_3^{--}$ theoretical for $BaCO_3$ | 27 |

[1] Basis of comparison is the carbon formation on a reduced catalyst consisting of 99% precipitated iron oxide and 1% potassium fluoride.

The above data show that carbon formation on this catalyst is only a fraction of that observed on the reference catalyst, while liquid product yields at high temperatures are excellent in spite of the absence of any catalyst promoter. However, low carbon formation is also evidence of a lower disintegration tendency for catalysts having a comparable abrasion resistance.

The activity and selectivity of this catalyst are substantially maintained even after high temperature calcination. A sample of the fresh catalyst was calcined for about 4 hours at 1600° F. before reduction at 900° F. The catalyst so prepared was tested in a fixed bed laboratory unit at about 630°–650° F., about 250 lbs. per sq. in. pressure, a throughput of about 200 volumes of synthesis gas per volume of catalyst per hour, and an $H_2$:CO ratio of 1:1. The results are summarized below.

| | |
|---|---|
| Co conversion, per cent | 94 |
| $C_4$+ yield (cc./cu. m. $H_2$+CO cons.) | 132 |
| $C_3$+ yield (cc./cu. m. $H_2$+CO cons.) | 237 |
| Carbon formation: | |
|   Selectivity to C, volume per cent CO to C | 0.71 |
|   Selectivity to C, per cent of reference [1] | 44 |
| Catalyst age: | |
|   Cu. ft. of CO converted per lb. of catalyst | 144 |

[1] Basis of comparison is the carbon formation on a reduced catalyst consisting of 99% precipitated iron oxide and 1% potassium fluoride.

*Example II*

A catalyst was prepared as described in Example I. However, 20.2 gms. of $K_2CO_3$ was stirred into the washed paste prior to drying. The precipitate paste was then dried and pilled as described in Example I to form a catalyst consisting of 80 parts by weight of $BaCO_3$, 20 parts by weight of $FeCO_3$ and 2 parts by weight of $K_2CO_3$. The catalyst was reduced and tested at the conditions of Example I. The results were as follows.

CO conversion, per cent_____ 96
C₄⁺ yield, cc. per cu. m. H₂+CO consumed _____ 211
Carbon formation:
  Selectivity to C, volume per cent CO to C_____ <1.9
  Selectivity to C, per cent volume of reference_____ <20
Catalyst age:
  Cu. ft. CO converted per lb. of catalyst _____ 126

The data of this example show that the addition of a promoter to the carbonate catalyst of the present invention has no appreciable influence on liquid yields or carbon formation.

*Example III*

A solution of 344 gms. of FeCl₂.4H₂O in 1 liter of water was slowly added to a slurry of 800 gms. of CaCO₃ in 4 liters of water. To this mixture there was then added slowly with stirring a solution of 225 gms. of ammonium carbonate in 1 liter of water. After stirring for 1 hour, the precipitate was permitted to settle and was washed free of chloride ion by decantation. The precipitate was then dried at 250° F. in a stream of CO₂ and pelleted.

The catalyst was reduced at 900° F. and tested under the conditions of Example I with the following results:

CO conversion, percent_____ 96
C₄⁺ yield (cc./m.³ cons.)_____ 205
Catalyst age:
  Cu. ft. CO converted per lb. of catalyst____ 79
  Percent CO₃⁻ after use_____ ~ 49
  Percent CO₃⁻ theoretical for CaCO₃ supported iron catalyst_____ ~ 49
Carbon formation:
  Selectivity to C, volume percent CO to C_____ 0.40
  Selectivity to C, percent of reference___ 16

*Example IV*

The catalyst was prepared as described in Example III. However, 20.2 gms. of K₂CO₃ was stirred into the washed precipitate paste. The precipitate was then further treated as described in Example III, the final catalyst containing 80 parts by weight of CaCO₃, 20 parts by weight of FeCO₃ and 2 parts by weight of K₂CO₃. A test was carried out at the conditions of Example III and had the following results.

CO conversion, percent_____ 86
C₄⁺ yield, cc./cu. m. of H₂+CO consumed__ 200+
Carbon formation:
  Selectivity to C, volume percent CO to C_____ 0.40
  Selectivity to C, percent of reference____ 23
Catalyst age:
  Cu. ft. of CO converted per lb. of catalyst_____ 133

The data of Examples III and IV show that the carbonate supported catalyst of the invention affords high activity and high liquid product sensitivity at high temperatures and gives low carbon formation, even in the absence of conventional catalyst promoters.

*Example V*

A solution was made containing 733 gms. of zinc chloride and 275 gms. of ferrous chloride (FeCl₂.4H₂O) in 2 liters of distilled water. An ammonium carbonate solution was made by dissolving 1480 gms. of ammonium carbonate in 6 liters of water. The two solutions were then added simultaneously with stirring to 5 liters of distilled water. After stirring for 1 hour, the precipitate was washed free of chloride ion and dried at 250° F. Contact with air was kept at a minimum during these steps.

This catalyst was reduced at 900° F. and tested in a fixed bed laboratory unit at about 600° F., about 250 lbs. per sq. in. pressure, a throughput of about 400 volumes of synthesis gas per volume of catalyst per hour, and an H₂:CO ratio of about 1:1. Under these conditions, a CO conversion of 95% was obtained. The C₄⁺ yield (cc. per cu. m. of H₂+CO consumed) was 160. These data show that group II metal carbonates other than barium and calcium are suitable as supports for highly active and selective iron catalysts even in the absence of conventional catalyst promoters.

*Example VI*

The catalyst was prepared as described in Example V. However, 135 gms. of the filter cake was slurried with water and 2.7 gms. of K₂CO₃ was then stirred into the paste. This paste was dried and treated as described in Example V, the final catalyst containing 80 parts by weight of ZnCO₃, 20 parts by weight of FeCO₃ and 2 parts by weight of K₂CO₃.

This catalyst was tested at 650° F. but otherwise at the conditions of Example V. Under these conditions a CO conversion of 96% was obtained. The C₄⁺ yield (cc. per cu. m. of H₂+CO consumed) was 200+.

These results show that the zinc carbonate supported catalyst is more sensitive to the addition of promoters than the barium and calcium carbonate catalysts. However, both types of catalysts exhibit a promoter effect clearly different from that of other types of iron catalysts. This is demonstrated by the data of Example VII below.

In this example it is seen that both Li₂O.Fe₂O₃ type catalyst and a zinc oxide promoted catalyst require promotion with K₂CO₃ in order to give high selectivity to C₄⁺.

*Example VII*

A catalyst having the composition Li₂O.Fe₂O₃ was made by mixing 444 gms. of lithium hydroxide into a paste of 842 gms. red iron oxide in 200 cc. of distilled water. After ball-milling for 18 hours and drying over-night at 240° F. the catalyst was calcined at 1600° F. for 3 hours.

A promoted catalyst having the composition by weight of 99Li₂O.Fe₂O₃—1K₂CO₃ was prepared by mixing 5 gms. K₂CO₃ into a paste containing 643 gms. of the dried Li₂O.Fe₂O₃ paste made as above. After drying at 240° F., the catalyst was calcined at 1600° F. for 3 hours.

A zinc oxide based iron type catalyst was prepared by adding slowly 1016 gms. of

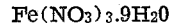

Fe(NO₃)₃.9H₂O dissolved in 2 liters of distilled water to a slurry of 1106 gms. ZnO in 3 liters of water. The slurry was stirred until all of the iron had precipitated. The precipitate was filtered, washed, reslurried, filtered and washed. Half of the filter cake was then dried at 250° F. and calcined for 3 hours at 850° F. The final catalyst contained 80 parts by weight of ZnO and 20 parts by weight of Fe₂O₃.

The other half of the washed filter cake was made into a thick paste and impregnated with 5 gms. $K_2CO_3$. The paste was dried and then calcined for 3 hours at 850° F., the final composition being about 80 parts by weight of ZnO, 20 parts by weight of $Fe_2O_3$ and 1 part by weight of $K_2CO_3$.

These catalysts were reduced at 900° F. and tested at temperatures above 600° F. with a feed gas containing an $H_2$/CO ratio of about 1. The results are summarized below.

| Catalyst Base | $Li_2O.Fe_2O_3$ | | $80ZnO$-$20Fe_2O_3$ | |
|---|---|---|---|---|
| Promoter | None | 1% $K_2CO_3$ | None | 1% $K_2CO_3$ |
| Temperature, °F | 650 | 650 | 650 | 650 |
| Pressure, p. s. i. g | 250 | 250 | 250 | 250 |
| Feed Rate, v./v./hr | 400 | 200 | 200 | 200 |
| CO Conversion, Percent | 90 | 96 | 95 | 97 |
| $C_4^+$ Yield (c. c./cu. m. CO+$H_2$ Cons.) | 100 | 172 | 108 | 196 |
| Hours on Stream | 246 | 54 | 207 | 208 |
| Selectivity to C. (Percent of Reference) | 80 | 105 | 10 | 28 |

The above data illustrate the extremly strong effect of alkali metal promoters on liquid product and carbon selectivities, which is typical for usual iron type synthesizing catalysts. It will be observed that the catalysts of the invention differ widely in this respect from non-carbonate catalysts of the iron type.

It has also been found that the metal carbonate supported iron catalysts of the invention are far superior to catalysts consisting essentially of iron carbonate and this in spite of the much higher iron content of the latter. This is demonstrated by the following further example.

*Example VIII*

Ferrous carbonate was precipitated by the simultaneous slow addition of aqueous solutions of ferrous chloride and ammonium carbonate to water under stirring. The precipitate was allowed to settle and washed free of chloride by decantation. One-half of the washed precipitate was dried in an atmosphere of $CO_2$ and pilled.

The other half of the washed precipitate was mixed with $K_2CO_3$ in amounts sufficient to incorporate about 2% of $K_2CO_3$ in the final catalyst, dried and pilled as described above.

Natural Siderite, containing $FeCO_3$ (in a concentration corresponding to 40.4% Fe) and with impurities of magnesium, silicon, manganese, calcium, and aluminum was crushed to a powder, calcined at 1000° F. in a closed pan, pilled and recalcined at 1000° F.

These three carbonate catalysts were reduced in hydrogen and tested at temperatures of 600° F. and above, and at a pressure of 250 p. s. i. g. with 1/1 $H_2$ and CO feed. The results are tabulated below.

| Catalyst | $FeCO_3$ (Synthetic) | | Siderite |
|---|---|---|---|
| Promoter | None | 2% $K_2CO_3$ | None |
| Temperature, °F | 600 | 600-650 | 600 |
| Feed Rate, v./v./hr | 400 | 400 | 200 |
| CO Conversion, Percent CO+$H_2$ | 96 | 94 | 92 |
| $C_4^+$ Yield (c. c./cu. m. $H_2$+CO Cons.) | 173 | 162 | 100 |

In the foregoing examples we have shown the use of a single metal carbonate as the catalyst support. It will be understood however, that similar results may be obtained when using suitable mixtures of the metal carbonates disclosed.

While the above experimental data were obtained in fixed bed operation, the relative comparisons hold for fluid operation, even though the higher gas throughputs, high recycle ratios and high catalyst turbulence typical for fluid operation quite generally cause a slight decrease of conversion and liquid product yields and an appreciable increase of carbon formation and catalyst disintegration. It follows that the catalysts of the invention, as a result of their greatly reduced carbonization and disintegration tendency and their superior liquid product selectivities even at high temperatures coupled with long catalyst life, are particularly useful for fluid catalyst operation and in this respect greatly superior to other catalysts of the iron type. Catalysts, in accordance with the invention, suitable for fluid operation may be prepared substantially as outlined in the above examples and sized to particle sizes of about 20-150 microns, preferably 50-100 microns. The conditions of fluid synthesis operation are well known in the art and need not be specified here in any great detail for a proper understanding of the invention by those skilled in the art. Briefly, these conditions may include catalyst particle sizes of 20-200 microns, superficial linear gas velocities of about 0.1-3 ft./sec., bed densities of about 10-120 lbs. per cu. ft., $H_2$:CO ratios of about 0.5-3, gas recycle ratios of about 0-5, temperatures of about 550°-750° F., and pressures of about 150-650 lbs. per sq. in.

This application is a division of Serial No. 777,373, filed October 1, 1947, now U. S. Patent No. 2,553,415.

The present invention is not to be limited by any theory of the mechanism of the process or catalyst nor to any examples given merely for illustration purposes, but only by the following claims in which we wish to claim all novelty inherent in the invention.

What is claimed is:

1. The improved process for producing valuable conversion products from CO and $H_2$ in the presence of iron-type catalysts which comprises contacting CO and $H_2$ in synthesis proportions and at synthesis conditions adapted to the formation of normally liquid hydrocarbons with a catalyst consisting essentially of a reduced composite of a major proportion of zinc carbonate, a minor proportion of iron carbonate and a promotional amount of a potassium compound.

2. The process of claim 1 in which said conditions include temperatures of about 550°-750° F. and pressures of about 150-650 lbs. per sq. in.

3. The process of claim 1 in which said catalyst contains a promotional amount of potassium carbonate.

4. The method set forth in claim 1 in which the catalyst is prepared by precipitating ferrous carbonate on zinc carbonate, washing, drying and sizing the precipitate and reducing the sized product.

References Cited in the file of this patent

UNITED STATES PATENTS

| Number | Name | Date |
|---|---|---|
| 1,746,464 | Fischer et al. | Feb. 11, 1930 |
| 1,841,910 | Pier et al. | Jan. 19, 1932 |
| 2,299,806 | Dreyfus et al. | Oct. 27, 1942 |
| 2,411,726 | Holroyd et al. | Nov. 26, 1946 |
| 2,414,585 | Eggertsen | Jan. 21, 1947 |
| 2,418,888 | Kearby | Apr. 15, 1947 |